US009828100B2

(12) United States Patent
Wyss

(10) Patent No.: US 9,828,100 B2
(45) Date of Patent: Nov. 28, 2017

(54) AIRCRAFT SEAT WITH TAXI, TAKEOFF AND LANDING LIE FLAT CAPABILITY

(71) Applicant: B/E Aerospace, Inc., Wellington, FL (US)

(72) Inventor: Alen Wyss, Winston-Salem, NC (US)

(73) Assignee: B/E AEROSPACE, INC., Wellington, FL (US)

( * ) Notice: Subject to any disclaimer, the term of this patent is extended or adjusted under 35 U.S.C. 154(b) by 298 days.

(21) Appl. No.: 14/537,224

(22) Filed: Nov. 10, 2014

(65) Prior Publication Data
US 2015/0130244 A1    May 14, 2015

Related U.S. Application Data

(60) Provisional application No. 61/902,967, filed on Nov. 12, 2013.

(51) Int. Cl.
*B64D 11/06* (2006.01)

(52) U.S. Cl.
CPC .... *B64D 11/06205* (2014.12); *B64D 11/0601* (2014.12); *B64D 11/0604* (2014.12); *B64D 11/0605* (2014.12)

(58) Field of Classification Search
CPC .......... B64D 11/06205; B64D 11/0604; B64D 11/0605; B64D 11/601
USPC ......................................... 297/351.13, 216.1
See application file for complete search history.

(56) References Cited

U.S. PATENT DOCUMENTS

| 6,059,364 | A  | * | 5/2000 | Dryburgh | ............. | A47C 1/0352 |
| | | | | | | 297/354.13 X |
| 8,523,220 | B1 | * | 9/2013 | Gehret | ...................... | 244/118.5 |
| 2001/0000639 | A1 | * | 5/2001 | Park | ..................... | A47C 1/0352 |
| | | | | | | 297/354.13 X |

* cited by examiner

*Primary Examiner* — Anthony D Barfield
(74) *Attorney, Agent, or Firm* — Shumaker, Loop & Kendrick, LLP

(57) ABSTRACT

A side-facing aircraft passenger seat having a head rest, seat back, seat bottom and leg rest moveable between an upright seating position and a lie flat sleeping position, and including a plurality of air bags positioned in at least partially surrounding orientation in relation to the seat and inflatable to provide comfort and protection to a seat occupant while in the lie flat sleeping position. The seat may be oriented obliquely to the longitudinal axis of the aircraft.

24 Claims, 3 Drawing Sheets

AIRCRAFT SEAT WITH TAXI, TAKEOFF AND LANDING LIE FLAT CAPABILITY

CROSS REFERENCE TO RELATED PATENT APPLICATION

This application claims priority to U.S. Provisional Patent Application No. 61/902,967, filed Nov. 12, 2013, the contents of which are expressly incorporated herein by reference in its entirety.

TECHNICAL FIELD AND BACKGROUND OF THE INVENTION

The present invention relates to a premium class airline passenger seats. One such type of seat is one that is able to adjust between upright and flat seating positions to provide passenger comfort and comply with taxi, take-off and landing seating position requirements. Such passenger seats typically include a seat back and seat pan, linked in motion, supported by a frame and adjustable to the desired seating position by way of a seat recline mechanism.

Another type of premium class seat may include various combinations of a lie flat seat, retractable armrests, bed extension work space and ottoman to create a horizontal space envelope for sleeping. This horizontal space envelope provides an angled sleeping position with a fully forward facing lounge seating position with full recline functionality. The seat arrangement may also provide an aisle side opening closet, sliding privacy screen, minibar, single piece retracting table, integral luggage storage area and wide-screen display monitor in a configuration for business and first class travel.

In both types of seating as presently installed in passenger aircraft, the passenger is required to be seated and restrained by a lap belt in a full upright position for taxi, takeoff, landing, and at any time during flight when so instructed by the flight crew. Only after safety announcements, takeoff and climb to altitude are passengers generally permitted to recline the seat to a lie flat position for rest or sleep. This is necessary because of safety requirements that are dictated by the structure of the seat and the nature of the restraint devices that stabilize the passenger and protect against or minimize injury in the event of turbulence or crash.

On some air routes on which premium lie flat seating is available, the amount of time allotted to sleep is restricted due to the total time between takeoff and landing, and the time required to board the aircraft, stow carry-on luggage, provide safety announcements, take off and climb to altitude. For example, in a flight having a total flight time of six hours, as much as two hours of that time may be taken up with boarding, providing safety announcements, climbing to cruising altitude and then preparing for landing. A passenger desiring to sleep in a fully reclined position must wait until permission is granted to transition the seat into the lie flat position. This is because of the requirement that the seat back remain upright during these portions of the flight which, in turn, is required because the construction of the seat and the passenger restraints provided in current seating designs. Therefore, a substantial amount of time that a passenger might otherwise be able to sleep in a reclined position is not available.

With the exception of medical emergency flights where the patient is tightly strapped to a stretcher, it is not currently permitted for a commercial aircraft passenger to assume a reclined, lie flat position during taxi, takeoff and landing. Use of a seat designed to permit the passenger to take a lie flat position before takeoff would permit the passenger, if desired, to go to sleep even before takeoff. On flights of specific duration, passengers to be seated in premium seating areas could eat a meal, listen to safety instructions and undertake any other necessary tasks or functions immediately before boarding the aircraft, and upon boarding take his or her assigned seat, recline the seat to a lie flat position and go to sleep even before taxi and takeoff. This enhanced capability would appeal to a certain segment of the flying public willing to pay extra for the ability to rest and/or sleep in a prone position for a longer period of time during the flight. In general, a series of air bags that are inflatable to provide protective cushioning during sleep and deflated and retracted when the passenger is not in the lie flat position would be provided as an integral part of the seating structure.

A separate reason for providing the ability to reside in a prone position during taxi, takeoff and landing is to provide enhanced safety to passengers traveling in premium class seating areas. If properly restrained, a lie flat, prone position can provide greater protection against injury by surrounding the passenger with a series of deployable air bags similar to those present in motor vehicles. In other words, an impact instantaneously deploys one or more air bags, which immediately deflate in order to permit egress from the aircraft.

SUMMARY OF THE INVENTION

It is therefore an object of the present invention to provide a lie flat premium aircraft seat that permits a passenger to reside in a lie flat, prone position during taxi, takeoff and landing.

It is a further object of the invention to provide a lie flat premium aircraft seat equipped with means to provide crash protection to a passenger residing in a lie flat, prone position in a passenger seat.

According to one embodiment of the invention, a side-facing aircraft passenger seat is provided having a head rest, seat back, seat bottom and leg rest moveable between an upright seating position and a lie flat sleeping position, and includes a plurality of air bags positioned in at least partially surrounding orientation in relation to the seat and inflatable to provide comfort and protection to a seat occupant while in the lie flat sleeping position.

In accordance with a further embodiment of the invention, the air bags are selectively inflatable and deflatable as the seat occupant moves between the lie flat position and the upright seating position.

In accordance with a further embodiment of the invention, the air bags are single use air bags that include a sensor and trigger that instantaneously inflates the air bags in the event of an abrupt deceleration sufficient to cause the sensor to deliver a signal to the trigger.

In accordance with a further embodiment of the invention, the head rest, seat back, seat bottom and leg rest are positioned within a fixed position shell having at least one major aisle-adjacent wall oriented in alignment with a longitudinal axis of the aircraft, and further wherein the head rest, seat back, seat bottom and leg rest are oriented at an oblique angle to the longitudinal axis of the aircraft.

In accordance with a further embodiment of the invention, the head rest, seat back, seat bottom and leg rest are arranged whereby a passenger occupying the seat faces forward generally in the direction of forward travel of the aircraft.

In accordance with a further embodiment of the invention, a plurality of seats are positioned in an arrangement whereby the seats are oriented at an oblique angle to the longitudinal axis of the aircraft and are positioned in a staggered array with the head rest, seat back, seat bottom and leg rest of a first seat angularly offset to an adjacent second seat.

In accordance with a further embodiment of the invention, at least one of the air bags is a long, narrow air bag positioned in an inflated condition adjacent the seat bottom and leg rest to cushion the seat occupant against forward movement along the longitudinal axis of the aircraft.

In accordance with a further embodiment of the invention, at least one of the air bags is a long, narrow air bag positioned in an inflated condition adjacent the head rest and seat back to cushion the seat occupant against forward movement along the longitudinal axis of the aircraft.

In accordance with a further embodiment of the invention, at least one of the air bags is a long, narrow air bag positioned adjacent the seat bottom and leg rest to cushion the seat occupant against forward movement along the longitudinal axis of the aircraft, the air bag being selectively inflatable by the seat occupant to provide a desired degree of comfort while in the reclined position.

In accordance with a further embodiment of the invention, at least one of the air bags is a long, narrow air bag positioned in a deflated condition adjacent the seat bottom and leg rest and adapted to inflate upon an abrupt deceleration of the aircraft cushion the seat occupant against injury resulting from forward movement along the longitudinal axis of the aircraft and then deflate to enable the seat occupant to exit the seat.

In accordance with a further embodiment of the invention, a plurality of air bags is positioned in an inflated condition adjacent the seat bottom and leg rest to cushion the seat occupant against forward movement along the longitudinal axis of the aircraft.

In accordance with a further embodiment of the invention, a plurality of air bags is positioned in an inflated condition adjacent the head rest, seat back, seat bottom and leg rest to cushion the seat occupant against forward movement along the longitudinal axis of the aircraft.

In accordance with a further embodiment of the invention, a plurality of air bags is positioned in the seat and positioned in an inflated condition adjacent the seat bottom and leg rest to cushion the seat occupant against forward movement along the longitudinal axis of the aircraft.

In accordance with a further embodiment of the invention, a plurality of air bags is positioned in the seat wherein at least one of the air bags is a long, narrow air bag positioned in a deflated condition adjacent the seat bottom and leg rest and adapted to inflate upon an abrupt deceleration of the aircraft cushion the seat occupant against injury resulting from forward movement along the longitudinal axis of the aircraft and then deflate to enable the seat occupant to exit the seat.

In accordance with a further embodiment of the invention, a plurality of air bags is positioned in the seat wherein at least one of the air bags is a long, narrow air bag positioned in a deflated condition adjacent the seat bottom and leg rest and adapted to inflate upon an abrupt deceleration of the aircraft cushion the seat occupant against injury resulting from forward movement along the longitudinal axis of the aircraft and then deflate to enable the seat occupant to exit the seat.

In accordance with a further embodiment of the invention, a plurality of air bags is positioned in the seat wherein at least one of the air bags is a long, narrow air bag positioned in a deflated condition adjacent the seat bottom and leg rest, the air bag being selectively inflatable by the seat occupant to provide a desired degree of comfort while in the reclined position.

In accordance with a further embodiment of the invention, a side-facing aircraft passenger seat is provided, having a head rest, seat back, seat bottom and leg rest moveable between an upright seating position and a lie flat sleeping position, and includes a plurality of air bags positioned in at least partially surrounding orientation in relation to the seat and inflatable to provide comfort and protection to a seat occupant while in the lie flat sleeping position. The head rest, seat back, seat bottom and leg rest are positioned within a fixed position shell having at least one major aisle-adjacent wall oriented in alignment with a longitudinal axis of the aircraft, and oriented at an oblique angle to the longitudinal axis of the aircraft. The head rest, seat back, seat bottom and leg rest are arranged whereby a passenger occupying the seat faces forward generally in the direction of forward travel of the aircraft.

In accordance with a further embodiment of the invention, a plurality of seats are positioned in an arrangement whereby the seats are oriented at an oblique angle to the longitudinal axis of the aircraft and are positioned in a staggered array with the head rest, seat back, seat bottom and leg rest of a first seat angularly offset to an adjacent second seat.

In accordance with a further embodiment of the invention, at least one of the air bags is a long, narrow air bag positioned adjacent the seat bottom and leg rest to cushion the seat occupant against forward movement along the longitudinal axis of the aircraft, and the air bag is selectively inflatable by the seat occupant to provide a desired degree of comfort while in the reclined position.

In accordance with a further embodiment of the invention, at least one of the air bags is a long, narrow air bag positioned in a deflated condition adjacent the seat bottom and leg rest and adapted to inflate upon an abrupt deceleration of the aircraft cushion the seat occupant against injury resulting from forward movement along the longitudinal axis of the aircraft and then deflate to enable the seat occupant to exit the seat.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
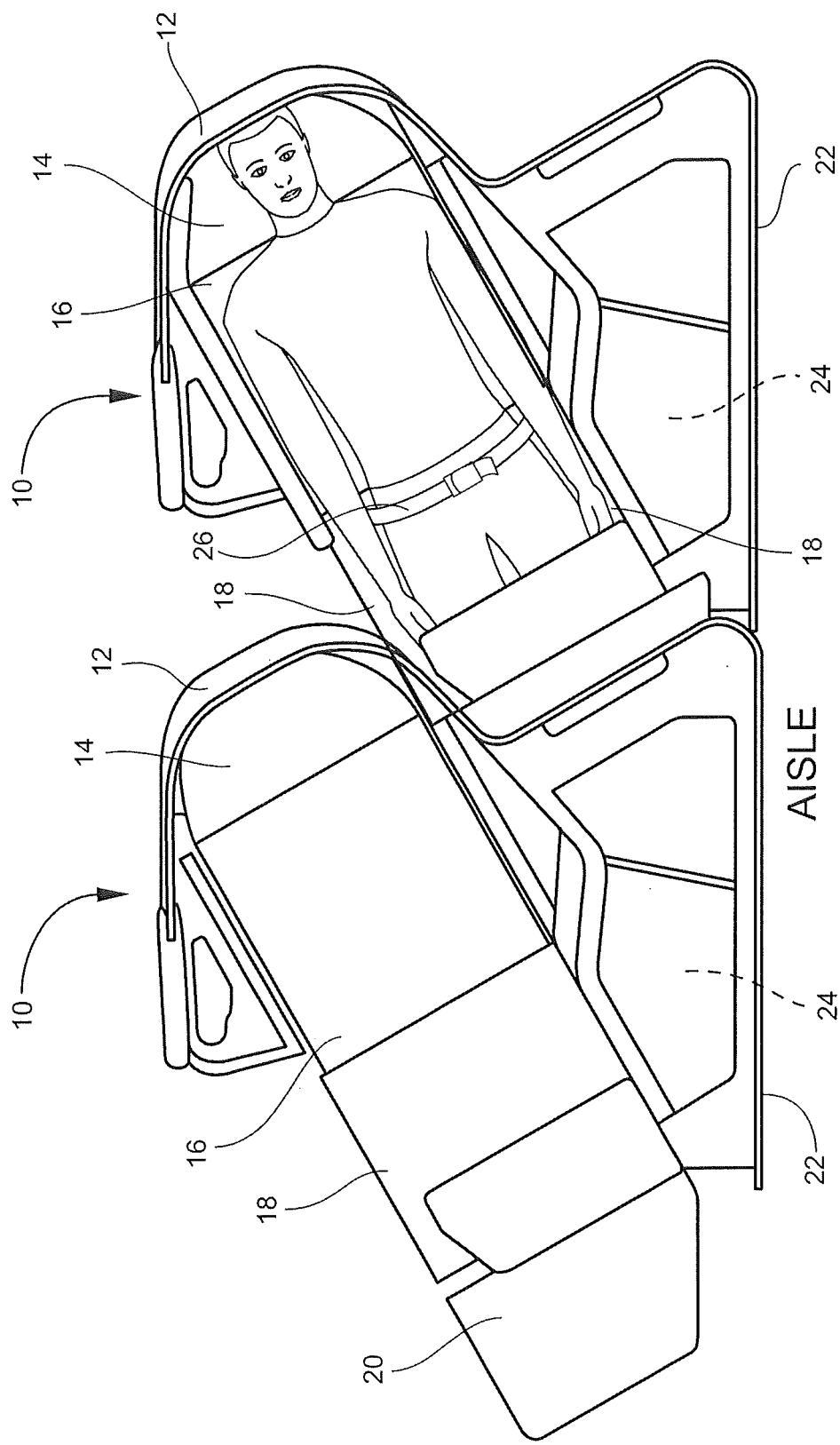
FIG. 1 is a top plan view of a pair of aisle access lie flat seats according to one embodiment of the invention.

Referring now specifically to the drawings, a pair of lie flat aisle access aircraft seats 10 is shown. The seats 10 each include a fixed position shell 12 within which is positioned a head rest 14, seat back 16, a seat bottom 18 and a leg rest 20. The shells 12 of the seats 10 include aisle-adjacent segments 22 that extend along and define the longitudinal axis of the aircraft. Thus, the head rests 14, seat backs 16, seat bottoms 18 and leg rests 20 are side facing at an oblique angle to the longitudinal axis of the aircraft. The angled orientation substantially reduces the possibility and/or extent of "submarining" in the event of a crash or other abrupt deceleration.

The areas between the aisle-adjacent segments 22 define wells 24 that allow the legs and feet of the passengers to extend forwardly to occupy the areas between the aisle-adjacent segments 22 and the seat bottoms 18 and leg rests 20. The wells 24 are enclosed on the top surface by passenger convenience features such as retractable tables and the like and serve to restrain forward movement of the passenger. As in conventional seats, a lap belt 26 provides a further restraint to the passenger.

Figure 2:
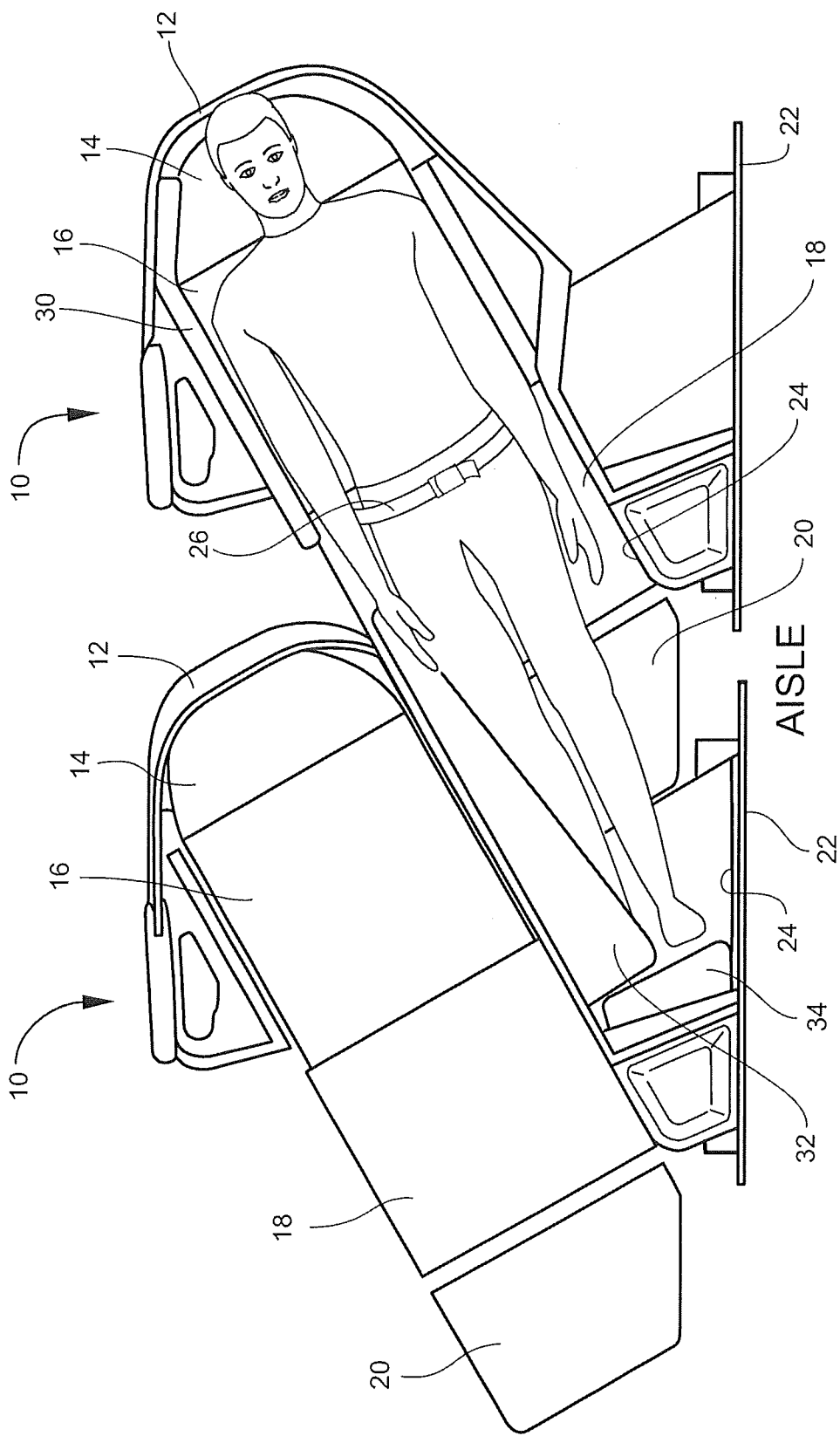
FIG. 2 is horizontal cross-sectional view of the seats according to shown in FIG. 1, illustrating the position of stabilizing air bags.
Figure 3:
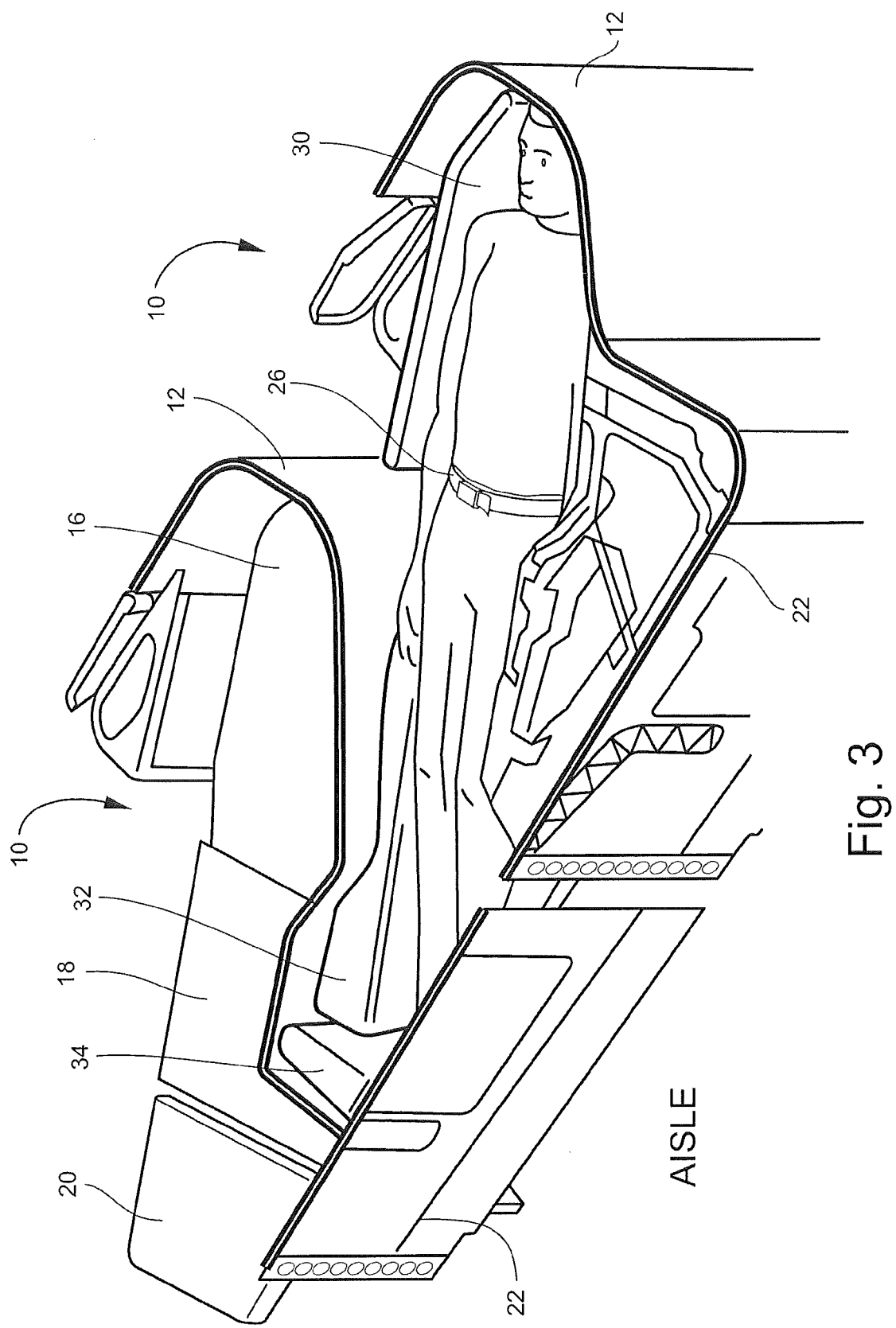
FIG. 3 is a top perspective view of the cross-section of the pair of aisle access lie flat seats shown in FIG. 2.

Referring now to FIGS. 2 and 3, with the well 24 of the occupied seat 10 shown, three air bags 30, 32 and 34 are shown. Air bag 30 is a long, narrow curtain-style air bag that, when inflated, occupies space between the occupant and the right side of the shell 12. Air bag 32 is a long, narrow structure that is positioned to inflate to the side and above the lower extremity of the seat occupant to occupy space in the well 24 and to cushion the passenger against forward movement along the longitudinal axis of the aircraft. Air bag 34 is a small bolster-type structure that provides a cushioning barrier between the feet and legs of the seat occupant and the forward end of the well 24.

Two distinct embodiments of the above-illustrated structures are possible. First, in the embodiment wherein the seat occupant is allowed to rest or sleep in a fully reclined, lie flat position during taxi, takeoff and landing, the air bags 30, 32, 34 may be inflated to provide comfort, cushioning and protection. This type of inflation is achieved by connecting the air bags 30, 32, 34, to an air supply and pump, so they can be selectively and repeatedly inflated and deflated as the seat occupant moves between a lie flat position and an upright seated position. The air bags could be controlled by the seat occupant by means of control buttons on the seat control panel, typically located on or near an arm rest.

In an alternative embodiment, the air bags 30, 32, 34 are "single use" devices provided only for impact protection in the event of a crash or other abrupt deceleration. In a manner similar to vehicle air bags, a deceleration exceeding a specified g-force causes the air bags 30, 32, 34 to instantaneously inflate and then deflate to permit egress by the seat occupant. The air bag mechanism includes a sensor and trigger that instantaneously inflates the air bags 30, 32, 34 in the event of an abrupt deceleration sufficient to cause the sensor to deliver a signal to the trigger. Note that the air bags 32 and 34 are on the side of the seat 10 away from the aisle in order not to interfere with egress.

A lie flat premium aircraft seat that permits a passenger to reside in a lie flat, prone position during taxi, takeoff and landing according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. An aircraft passenger seating unit comprising:
   a passenger seat comprising a head rest, a seat back, a seat bottom and a leg rest, the seat configured to move between an upright seating position and a lie flat sleeping position;
   at least one fixed position shell adjacent to the lie flat sleeping seating position of the passenger seat; and
   a plurality of air bags disposed between the at least one fixed position shell and the lie flat sleeping position of the passenger seat and inflatable to provide comfort and protection to a seat occupant while in the lie flat sleeping position.

2. The aircraft passenger seating unit according to claim 1, wherein the plurality of air bags are selectively inflatable and deflatable as the seat occupant moves between the lie flat position and the upright seating position.

3. The aircraft passenger seating unit according to claim 1, wherein the plurality of air bags are single use air bags that include a sensor and trigger that instantaneously inflates the plurality of air bags in an event of an abrupt deceleration sufficient to cause the sensor to deliver a signal to the trigger.

4. The aircraft passenger seating unit according to claim 1, wherein a first fixed position shell of the at least one fixed position shell has at least one major aisle-adjacent wall oriented in alignment with a longitudinal axis of the aircraft, and further wherein the head rest, seat back, seat bottom and leg rest are oriented at an oblique angle to the longitudinal axis of the aircraft.

5. The aircraft passenger seating unit according to claim 4, wherein the head rest, seat back, seat bottom and leg rest are arranged whereby a passenger occupying the seat faces forward generally in the direction of forward travel of the aircraft.

6. The aircraft passenger seating unit according to claim 1, wherein a plurality of seats are positioned in an arrangement whereby the seats are oriented at an oblique angle to a longitudinal axis of the aircraft and are positioned in a staggered array with the head rest, seat back, seat bottom and leg rest of a first seat angularly offset to an adjacent second seat.

7. The aircraft passenger seating unit according to claim 1, wherein at least one of the plurality of air bags is a long, narrow air bag positioned in an inflated condition adjacent the seat bottom and leg rest to cushion the seat occupant against forward movement along a longitudinal axis of the aircraft.

8. The aircraft passenger seating unit according to claim 1, wherein at least one of the plurality of air bags is a long, narrow air bag positioned in an inflated condition adjacent the head rest and seat back to cushion the seat occupant against forward movement along a longitudinal axis of the aircraft.

9. The aircraft passenger seating unit according to claim 1, wherein at least one of the plurality of air bags is a long, narrow air bag positioned adjacent the seat bottom and leg rest to cushion the seat occupant against forward movement along a longitudinal axis of the aircraft, the air bag being selectively inflatable by the seat occupant to provide a desired degree of comfort while in the reclined position.

10. The aircraft passenger seating unit according to claim 1, wherein at least one of the plurality of air bags is a long, narrow air bag positioned in a deflated condition adjacent the seat bottom and leg rest and adapted to inflate upon an abrupt deceleration of the aircraft cushion the seat occupant against injury resulting from forward movement along a longitudinal axis of the aircraft and then deflate to enable the seat occupant to exit the seat.

11. The aircraft passenger seating unit according to claim 1, wherein the plurality of air bags are positioned in an inflated condition adjacent the seat bottom and leg rest to cushion the seat occupant against forward movement along a longitudinal axis of the aircraft.

12. The aircraft passenger seating unit according to claim 1, and including a plurality of air bags positioned in an inflated condition adjacent the head rest, seat back, seat bottom and leg rest to cushion the seat occupant against forward movement along a longitudinal axis of the aircraft.

13. The aircraft passenger seating unit according to claim 1, further comprising an additional air bag positioned in the seat and positioned in an inflated condition adjacent the seat bottom and leg rest to cushion the seat occupant against forward movement along a longitudinal axis of the aircraft.

14. The aircraft passenger seating unit according to claim 1, wherein at least one of the plurality of air bags is a long, narrow air bag positioned in a deflated condition adjacent the seat bottom and leg rest and adapted to inflate upon an abrupt deceleration of the aircraft, to cushion the seat occupant against injury resulting from forward movement along a longitudinal axis of the aircraft and then to deflate to enable the seat occupant to exit the seat.

15. The aircraft passenger seating unit according to claim 1, wherein at least one of the plurality of air bags is a long, narrow air bag positioned in a deflated condition adjacent the seat bottom and leg rest, the air bag being selectively inflatable by the seat occupant to provide a desired degree of comfort while in the reclined position.

16. An aircraft passenger seat for installation in an aircraft, the aircraft passenger seat comprising:
  a head rest, a seat back, a seat bottom, and a leg rest moveable between an upright seating position and a lie flat sleeping position; and
  a plurality of air bags inflatable to provide comfort and protection to a seat occupant while the passenger seat is in the lie flat sleeping position,
  wherein the aircraft passenger seat is mounted at an oblique angle to a longitudinal axis of the aircraft; and
  wherein the plurality of air bags are arranged for deployment along a side of the seat occupant opposite an aisle of the aircraft while the passenger seat is in the lie-flat seating position such that the plurality of air bags avoid interference with egress of the seat occupant into the aisle.

17. The aircraft passenger seat according to claim 16, wherein a plurality of seats are positioned in an arrangement whereby the plurality of seats are oriented at the oblique angle to the longitudinal axis of the aircraft and are positioned in a staggered array with the head rest, seat back, seat bottom and leg rest of a first seat angularly offset to an adjacent second seat.

18. The aircraft passenger seat according to claim 16, wherein at least one of the plurality of air bags is a long, narrow air bag positioned adjacent the seat bottom and leg rest to cushion the seat occupant against forward movement along the longitudinal axis of the aircraft, the long, narrow air bag being selectively inflatable by the seat occupant to provide a desired degree of comfort.

19. The aircraft passenger seat according to claim 16, wherein at least one of the plurality of air bags is a long, narrow air bag positioned in a deflated condition adjacent the seat bottom and leg rest and adapted to inflate upon an abrupt deceleration of the aircraft to cushion the seat occupant against injury resulting from forward movement along the longitudinal axis of the aircraft.

20. The aircraft passenger seat according to claim 16, wherein at least one of the plurality of air bags is positioned in an inflated condition adjacent the seat bottom and leg rest to cushion the seat occupant against forward movement along the longitudinal axis of the aircraft.

21. The aircraft passenger seat according to claim 16, wherein:
  the aircraft passenger seat further comprises a fixed position shell; and
  at least one of the plurality of air bags is positioned in an inflated condition adjacent the head rest and seat back on the fixed position shell, wherein the at least one air bag is configured to cushion the seat occupant against forward movement along the longitudinal axis of the aircraft.

22. The aircraft passenger seat according to claim 16, wherein the plurality of air bags are positioned in an inflated condition adjacent the seat bottom and leg rest to cushion the seat occupant against forward movement along the longitudinal axis of the aircraft.

23. The aircraft passenger seat according to claim 16, wherein at least one of the plurality of air bags is a long, narrow air bag positioned in a deflated condition adjacent the seat bottom and leg rest and adapted to inflate upon an abrupt deceleration of the aircraft cushion the seat occupant against injury resulting from forward movement along the longitudinal axis of the aircraft and then deflate to enable the seat occupant to exit the seat.

24. The aircraft passenger seat according to claim 16, wherein at least one of the plurality of air bags is a long, narrow air bag positioned in a deflated condition adjacent the seat bottom and leg rest, the long, narrow air bag being selectively inflatable by the seat occupant to provide a desired degree of comfort.

* * * * *